(12) United States Patent
Shu et al.

(10) Patent No.: US 6,309,740 B1
(45) Date of Patent: *Oct. 30, 2001

(54) HIGH TEMPERATURE HEAT TRANSFER BARRIER AND VAPOR BARRIER AND METHODS

(75) Inventors: Larry S. Shu, Newton; Paul Cirignano, Braintree, both of MA (US)

(73) Assignee: W. R. Grace & Co.-Conn., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,190

(22) Filed: Jul. 20, 1999

(51) Int. Cl.[7] .......................................................... B27N 9/00
(52) U.S. Cl. .......................... 428/221; 428/920; 428/921; 252/605; 252/607; 252/610; 427/202; 427/426; 427/427
(58) Field of Search ..................................... 428/920, 921, 428/221; 427/202, 426, 427; 252/605, 607, 610

(56) References Cited

U.S. PATENT DOCUMENTS

| | | | |
|---|---|---|---|
| 4,366,203 | 12/1982 | Briggs | 428/304.4 |
| 4,366,204 | 12/1982 | Briggs | 428/304.4 |
| 4,425,465 | 1/1984 | Paget et al. | 524/450 |
| 4,608,303 | 8/1986 | Ballard et al. | 428/357 |
| 4,655,842 | 4/1987 | Ou et al. | 106/288 |
| 4,751,024 | 6/1988 | Shu et al. | 252/601 |
| 4,780,147 | 10/1988 | Ou et al. | 106/415 |
| 4,904,503 | 2/1990 | Hilton et al. | 427/373 |
| 5,034,160 | 7/1991 | Kindt et al. | 252/604 |
| 5,102,464 | 4/1992 | Ou | 106/415 |
| 5,116,537 | 5/1992 | Yang et al. | 252/378 |
| 5,244,740 | 9/1993 | Ou et al. | 428/446 |
| 5,330,843 | 7/1994 | Ou et al. | 428/446 |
| 5,340,612 | 8/1994 | Perito et al. | 427/403 |
| 5,487,946 | 1/1996 | McGinniss et al. | 428/413 |
| 5,556,578 | 9/1996 | Berneburg et al. | 252/604 |

*Primary Examiner*—Elizabeth M. Cole
(74) *Attorney, Agent, or Firm*—Craig K. Leon; William L. Baker

(57) ABSTRACT

The use of a relatively tin vermiculite coating layer, preferably spray-applied as an aqueous dispersion of delaminated vermiculite platelets, over a (primary) spray-applied hydratable cementitious fireproofing coating, has been found surprisingly to provide fireproofing protection that equals or exceeds that provided by fireproofing used alone. Accordingly, the time, effort, and costs normally incurred by the need to achieve thick coating layers in conventional fireproofing are considerably decreased.

15 Claims, 1 Drawing Sheet

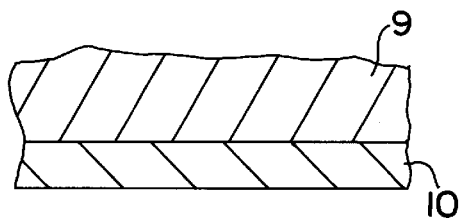
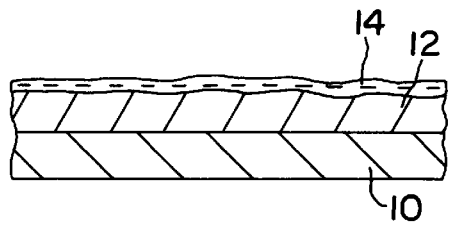
FIG. 1A PRIOR ART
FIG. 1B
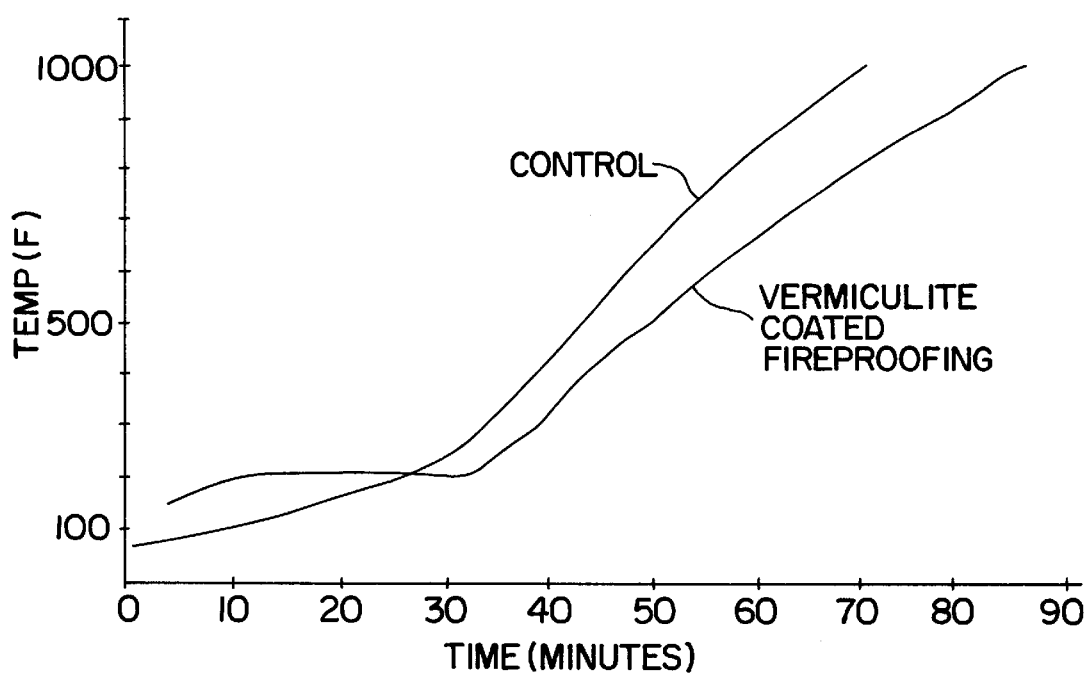
FIG. 2

HIGH TEMPERATURE HEAT TRANSFER BARRIER AND VAPOR BARRIER AND METHODS

FIELD OF THE INVENTION

The present invention relates to spray-applicable cementitious fireproofing, and in particular to a coating system and method relative to the use of a spray-applicable primary cementitious fireproofing coating and the use of an overlying secondary coating formed using an aqueous dispersion of delaminated vermiculite platelets.

BACKGROUND OF THE INVENTION

It is well known to spray-apply fireproofing slurries to metal structural members and other building surfaces to provide a heat resistant coating thereon. Spray-applied, hydratable, cementitious fireproofing compositions are disclosed, for example, in U.S. Pat. No. 4,751,024 of Shu et al.; and U.S. Pat. No. 4,904,503 of Hilton et al.; U.S. Pat. No. 5,034,160 of Kindt et al.; and U.S. Pat. No. 5,340,612 of Perito, which are owned by the common assignee hereof and incorporated herein by reference. These fireproofing compositions teach the use of lightweight aggregates, such as shredded polystyrene particles, to obtain concentrations favorable for pumping the fireproofing composition through hoses, sometimes to great heights, to nozzles from which the fireproofing is sprayed onto a substrate surface using compressed air. Moreover, the fireproofing compositions provide non-segregating, uniform slurries displaying desired levels of adhesion to steel substrates and excellent fire protection. The density of the slurry compositions containing concentrations of lightweight aggregate is sufficiently low after application to ensure that the coating stays in place before and after setting. Thus, "fall off" of the applied composition due to inadequate adherence of mechanical and structural disturbance is minimized or eliminated. One of the unavoidable features of spray-applying cementitious fireproofing, however, is the need for achieving certain coating thicknesses. Such coating thicknesses are needed to meet fireproofing standards, and are attained, for the most part, through successive spray passes over the substrate surface. For example, U.S. Pat. No. 5,340,612 of Perito disclosed a sprayable fireproofing composition that provided a quick setting time such that multiple coatings of the slurry could be applied within the same working day. Nevertheless, there remains a concern that using multiple coatings to achieve minimal thicknesses sufficient for attaining fireproofing protection is time-consuming and labor-intensive.

The present invention pertains to the surprising discovery that the fireproofing performance of conventional spray-applicable cementitious fireproofing may be considerably enhanced using a secondary, overlying layer formed from an aqueous dispersion of delaminated vermiculite platelets. In other words, the present inventors envision that it is possible to use a relatively thinner coating of cementitious fireproofing without substantially sacrificing fireproofing efficacy. The ability to apply the fireproofing in a relatively thinner coating will conserve labor and energy, and expenses and time at the application site.

The present invention also does not need to rely upon lightweight or heavy aggregate, which may be optional, and thus provides the ability to use even thinner wet pass coatings that afford a savings in time and labor.

SUMMARY OF THE INVENTION

The present invention provides an improved hydratable cementitious fireproofing coating system and method by which a "thickness savings" can be realized without sacrificing substantial fireproofing efficacy. This is achieved by providing a relatively thin, overlying secondary coating formed from an aqueous dispersion of delaminated vermiculite platelets, placed on top of a primary coating layer formed from a hydratable cementitious fireproofing composition of the kind now conventionally used.

The present inventors have surprisingly found that this laminar coating arrangement can lead to a decrease in the thickness of the fireproofing coating normally required to achieve a given fireproofing performance level. The ability of the present invention to employ thinner spray-applied coating layers of primary fireproofing will conserve effort, time, labor, and expense, because the spray-application will require fewer passes during spray-application to attain minimum coating thickness. It is surmised by the inventors that the secondary vermiculite coating helps to contribute moisture barrier properties, such that the loss of inherent moisture from the cementitious fireproofing is slowed during exposure to fire or flames, while at the same time acts to transfer or deflect heat away from the underylying cementitious fireproofing composition. Thus, the ability to use relatively thinner cementitious fireproofing layers can translate into lower cumulative labor and time required for successive spray passes across the substrate surface to be protected.

A coating system for providing fireproofing protection to a substrate, comprising: (A) an hydratable cementitious fireproofing composition; and (B) a composition of delaminated vermiculite platelets. These components would be contained in separate containers but could be sold as part of a package, wherein the components are sold in pre-measured amounts suitable for application at a project site. Preferably, the fireproofing composition is spray-applied using an injected accelerator, as known in the fireproofing art (and the accelerator could be sold in its separate container), and the vermiculite coating layer is preferably spray-applied during or after the spraying of the fireproofing composition, as an aqueous dispersion, preferably using a separate spray nozzle.

An exemplary method of the invention thus comprises spray-applying onto a substrate surface a primary coating comprising a cementitious fireproofing composition, preferably using an injected accelerator; and, during this spray-application of the primary fireproofing coating or subsequent thereto, spray-applying over the coated substrate surface a secondary, overlying coating comprising an aqueous dispersion of delaminated vermiculite platelets. Thus, for example, the inventors envision that the operator of the spray equipment can mount a second nozzle (for spray-applying the vermiculite dispersion coating) adjacent to a first nozzel (for spray-applying the primary cementitious fireproofing coating), such that the dispersion can be quickly applied over substrate surface areas over which the first nozzle has just applied the fireproofing. Alternatively, the vermiculite dispersion coating may be spray-applied subsequent to the fireproofing-coated substrate surface using a second spray nozzle, or applied using some other conventional technique.

It is believed that the secondary overlying vermiculite coating can be applied either when the fireproofing coating is still wet or moist, or after the fireproofing has dried or substantially cured.

Further features and advantages of the invention are described in detail hereinafter.

BRIEF DESCRIPTION OF THE DRAWINGS

FIGS. 1A and 1B are pictorial representations, respectively, of a hydratable cementitious fireproofing of the prior art spray-applied onto a substrate (FIG. 1A) and of an fireproofing coating system of the present invention wherein a moisture vapor barrier/heat transfer barrier coating comprised of vermiculite platelets is located over a relatively thin cementitious fireproofing coating applied onto a substrate (FIG. 1B); and FIG. 2 is a graphic representation of comparative fireproofing performance, as described in Example 1, of a control sample (cementitious fireproofing composition only coated onto steel plate) and a sample exemplifying the teachings of the present invention (fireproofing coating on steel plate with overlying delaminated vermiculite platelet coating).

DETAILED DESCRIPTION OF EXEMPLARY EMBODIMENTS

As illustrated in FIG. 1B, the present invention pertains to the use of a hydratable cementitious fireproofing composition 12, which can be spray-applied preferably with an injected accelerator onto a substrate 10, and an aqueous dispersion of delaminated vermiculite platelets 14 which are preferably spray-applied to form a secondary overlying coating that acts as a moisture vapor barrier/heat transfer barrier over the fireproofing 12. This combination can provide similar fire protection capability, or even increased fire protection capabilities, when compared to thicker fireproofing-only coatings 9, as illustrated in FIG. 1A.

The present invention is contemplated for use in protecting the surfaces of substrates 10 such as steel beams and panels from fire, flames, and heat. In addition to metals such as steel and aluminum, other substrate materials can be protected, such as wood, glass, plastics, fabrics, composite materials (such as fiberglass and graphite-containing materials), and combinations of such materials. The compositions are preferably spray-applied in the manner of conventional fireproofing (see e.g., U.S. Pat. Nos. 4,904,503; 4,934,596; or 5,520,332, incorporated by reference herein), or may be brush, troweled, rolled, or applied by known means.

The primary hydratable cementitious fireproofing composition suitable for use in the invention is one which is preferably conventionally known in the fireproofing art. For example, the fireproofing compositions disclosed in U.S. Pat. No. 4,751,024 of Shu et al.; and U.S. Pat. No. 4,904,503 of Hilton et al.; U.S. Pat. No. 5,034,160 of Kindt et al.; and U.S. Pat. No. 5,340,612 of Perito, incorporated herein by reference, are all believed to be suitable for use as exemplary primary hydratable cementitious fireproofing compositions in the present invention. Fireproofing compositions are commercially available from Grace Construction Products, Cambridge, Mass., under the tradename MK-6®, which is especially suitable for use as exemplary hydratable cementitious fireproofing compositions in the present invention, and these can be applied using an injected accelerator (e.g., alum).

Preferred primary fireproofing compositions contain a binder (e.g., Plaster of Paris, gypsum, Portland cement, aluminous cement, pozzolanic cement, or a mixture thereof) and may optionally contain a lightweight aggregate having a bulk density in the range of 0.4–15 pounds per cubic foot (6.4–240 kg/cubic meter). The lightweight aggregate may, for example, comprise exfoliated (expanded) vermiculite (which is not to be confused with the use of an aqueous dispersion of delaminated vermiculite platelets as discussed herein), perlite, or, most preferably, shredded expanded polystyrene, as taught in U.S. Pat. No. 4,751,024 of Shu et al.; U.S. Pat Nos. 4,957,010 and 4,989,464 of Cirignano; and U.S. Pat. No. 5,462,235 of Driscoll et al.

Heavier aggregates may optionally be incorporated into the cementitious fireproofing composition instead of, or in addition to, the optional lightweight aggregates. These heavier aggregates may include, for example, coarse ground gypsum, bauxite, cement clinker, brucite, and granular aluminum hydroxide, which were identified in U.S. Pat. No. 5,556,578 as having hydration water. If heavy aggregates are incorporated into the fireproofing composition, then a preferred range amount for such heavy aggregates would be 20–80% by weight based on total solids in the fireproofing mix.

Exemplary vermiculite secondary coating layers may be formed by spray-application of an aqueous dispersions of delaminated vermiculite platelets. Commercially suitable vermiculite dispersions are available from Grace Construction Products under the tradename MICROLITE®. General background information pertaining to stable vermiculite dispersions believed suitable for use in the present invention may be found in U.S. Pat. No. 4,655,842 of Ou et al.; U.S. Pat. No. 4,780,147 of Ou et al.; U.S. Pat. No. 5,102,464 of Ou; U.S. Pat. No. 5,116,537 of Yang et al.; U.S. Pat. No. 5,330,843 of Ou et al.; or U.S. Pat. No. 5,244,740 of Ou et al., incorporated by reference herein. In addition, further background about how dispersions of vermiculite platelets can be made from vermiculite ore may be found in U.S. Pat. No. 4,608,303 of Ballard et al.; U.S. Pat. No. 4,425,465 of Padget et al.; or U.S. Pat. No. 4,366,203 and U.S. Pat. No. 4,366,204 of Briggs, also incorporated by reference herein.

Optionally, one may use a primer coating on the substrate surface (such as a paint), before applying the primary cementitious fireproofing coating and secondary vermiculite moisture barrier/heat barrier coating layer, and a further topcoat may also be optionally applied onto the vermiculite coating layer.

In preferred coating systems and methods of the invention, an exemplary hydratable cementitious fireproofing composition, preferably provided in powder form so that a spray-applicalbe slurry can be made at the application site by incorporation of the required amount of water, preferably comprises a cementitious binder (e.g., Portland cement, gypsum, or mixture thereof) in the amount of at least 30% based on total weight of composition, preferably at least 75%, and most preferably at least 85% based on total weight of composition, and optionally at least one light weight aggregate (e.g., shredded expanded polystyrene particles) in the amount of 1–5% by weight; and an exemplary secondary coating comprising an aqueous dispersion of delaminated vermiculite platelets.

As an illustration of the projected benefits of the secondary vermiculite dispersion coating, for a two-hour fire rating, the required thickness of the cementitious fireproofing barrier coating will depend on the configuration and size of the steel substrate. For a 10W49 column, the required thickness is 1.125 inches, which translates into a coverage rate of about 0.67 square feet per pound of packaged dry fireproofing material (e.g., MONOKOTE® MK-6® from Grace Construction Products, Cambridge, Mass.). However, it is estimated that when a secondary overlying vermiculite dispersion coating is applied on top of the fireproofing coating, in accordance with the teachings of the present invention, then the thickness will be decreased from 1.125 inches to 0.923 inches, which translates to an increased coverage rate of 0.82 square feet per pound of dry fireproofing material (This estimate is based on using MONOKOTE® MK-6® brand fireproofing from Grace Construction Products).

EXAMPLE 1

A comparative fire test was performed using 12"×12" steel plates. One plate was coated with 1" thickness of MONOKOTE® MK-6® fireproofing composition (available from Grace Construction Products, Cambridge, Mass.). The sample density was approximately 20.7 pounds per cubic foot (pcf). A second test plate was coated with 1" thickness of MONOKOTE® MK6® fireproofing (approximately 20.9 pcf), and a coating of MICROLITE® brand vermiculite dispersion (an aqueous dispersion of delaminated vermiculite platelets commercially available from Grace) was applied onto the fireproofing coating (covering the exposed face and sides of the coated fireproofing) at a coverage rate of 115 sqaure feet per gallon coverage rate. An attempt to make a third sample, by applying vermiculite dispersion directly onto the steel plate followed by coating with a fireproofing composition, was made, but the fireproofing did not adhere to the vermiculite dispersion-coated steel plate.

The samples were then placed into a gas furnace, with the vermiculite dispersion coating facing downwards, and fire tests were then run in accordance with ASTM-E119(90). At one minute test intervals, the interface between the steel plate and the fireproofing coating was measured, and it was determined that the control sample (fireproofing alone on steel plate) reached 1000° F. in about 98 minutes, whereas the vermiculite dispersion-coated/fireproofing coated steel plate reached 1000° F. in about 116 minutes. The surprising significance of this test is that the resultant increase in "time-until-failure" means that the present invention will afford a "thickness savings" in the spray-application of the fireproofing composition

TABLE 1

| Test | Sample | Density (pcf) | Time to Failure |
| --- | --- | --- | --- |
| #1 | Control | 20.7 | 98 minutes |
| #2 | Fireproofing only | 20.9 | 116 minutes |
| #3 | Fireproofing/Vermiculite | XXXX | XXXX |

"XXXX": fireproofing did not adhere to dispersion coated steel plate

Accordingly, the percent time increase provided by the secondary dispersion coating (Test #3) is compued as follows: 116-98 minutes/98 minutes=18%. Thus, an 18 percent increase in fireproofing efficacy can be achieved using a relatively thin vermiculite platelet coating over the fireproofing.

The test results, shown at 10 minute intervals (to conserve space while providing idea of comparative performance), are provided below in Table 2.

TABLE 2

| CONTROL SAMPLE (Fireproofing alone over steel plate) | | Fireproofing coating with Secondary Vermiculite Coating | |
| --- | --- | --- | --- |
| Time | Furnace Air Temp (avg of 5) degrees F. | Sample Surface Temp (avg of 4) degrees F. | Time | Furnace Air Temp (avg of 5) degrees F. | Sample Surface Temp (avg of 4) degrees F. |
| 0 | 58.8 | 70.9 | 0 | 63.2 | 67.5 |
| 10 | 1316.6 | 91.7 | 10 | 1314.8 | 116.1 |
| 20 | 1461.4 | 157.2 | 20 | 1463.5 | 189.4 |
| 30 | 1551.5 | 207.2 | 30 | 1556.1 | 211.1 |
| 40 | 1626.3 | 323.9 | 40 | 1619.3 | 260.7 |
| 50 | 1679.7 | 481.0 | 50 | 1658.9 | 378.9 |
| 60 | 1679.4 | 624.5 | 60 | 1686.0 | 505.6 |
| 70 | 1736.5 | 749.5 | 70 | 1712.6 | 620.3 |
| 80 | 1768.0 | 857.8 | 80 | 1746.0 | 722.2 |
| 90 | 1790.6 | 946.3 | 90 | 1778.5 | 812.9 |
| 98 | 1809.0 | 1004.1 | 98 | 1794.9 | 878.6 |
| test end | test end | | 100 | 1789.9 | 894.8 |
| | | | 110 | 1821.7 | 965.5 |
| | | | 116 | 1831.9 | 1004.5 |
| | | | test end | test end | |

The foregoing discussion and examples were provided for illustrative purposes and not intended to limit the scope of the invention as claimed.

We claim:

1. A coating system for providing fireproofing protection to a substrate, comprising:

an hydratable cementitious fireproofing composition providing as a powder in a container, said composition operative upon the addition of water to be spray-applied as a coating onto a substrate comprised of metal, wood, metal, composite material, glass, or mixture thereof, said fireproofing composition comprising; a cementitious binder in the amount of at least 30% by weight of said fireproofing composition, said binder comprising gypsum Plaster of Paris, Portland cement, aluminous, cement, pozzoalanic cement, or mixture thereof; and said fireproofing composition further comprising at least one light-weight aggregate in the amount of 1–5% by weight selected from the group consisting of expanded vermiculite, perlite, shredded polystyrene, or mixture thereof;

an accelerator provided in a container, said accelerator operative to be injected during spray-application of said fireproofing composition at an application site; and an aqueous dispersion provided in a container, of delaminated vermiculite platelets operative to provide an overlying coating over said hydratable cementitious fireproofing composition when said fireproofing composition is spray-applied on to a substrate surface.

2. The coating system of claim 1 wherein said fireproofing composition further comprises water whereby said powder is liquid flowable form that is spray-applicable onto a substrate.

3. The coating system of claim 2 wherein said fireproofing composition is spray-applied as primary coating onto a steel beam or panel at a coverage rate of 0.2–1.2 board feet per pound based on dry weight fireproofing composition; and said vermiculite coating is applied as a secondary coating onto said primary coating at a coverage rate of 50–200 square feet per gallon.

4. The coating system of claim 3 wherein said secondary vermiculite coating is spray-applied over said primary fireproofing coating at a coverage rate of 80–150 square feet per gallon.

5. Method for protecting a steel beam or panel, comprising: (A) spray-applying onto a steel beam or panel, using an injected accelerator, a hydratable cementitious fireproofing composition, said fireproofing composition comprising a cementitious binder in the amount of at least 30% by weight of said fireproofing composition, said binder comprising gypsum, Plaster of Paris, Portland cement, aluminous cement, pozzolanic cement, or mixture thereof; and said fireproofing composition further composition at least one light-weight aggregate in the amount of 1–5% by weight, said light-weight aggregate selected from the group consisting of expanded vermiculite perlite, shredded polystyrene, or mixture thereof, said fireproofing coating being spray-applied at a coverage rate of 0.2–1.2 board feet per pound based on the dry weight of the fireproofing composition; and (B) spray-applying onto said spray-applied coating of fireproofing composition at a coverage rate of 50–200 square feet per gallon a secondary coating comprising an aqueous dispersion of delaminated vermiculite platelets.

6. The method of claim 5 wherein said fireproofing composition and said vermiculite dispersion composition are spray-applied concurrently using separate spray nozzles.

7. The method of claim 5 wherein said fireproofing composition and said vermiculite dispersion composition are spray-applied successively using separate nozzles.

8. A fireproofing system comprising coatings applied onto steel substrate, said applied coatings comprising the compositions of claim 1.

9. A coating system of claim 1 wherein said binder is gypsum.

10. The method of claim 5 wherein said binder is gypsum.

11. The coating system of claim 1 wherein said light-weight aggregate has bulk density of 0.4–15pcf.

12. The coating system of claim 1 wherein said cementitious binder comprises at least 75% based on total weight of said fireproofing composition.

13. The coating system of claim 1 wherein said cementitious binder comprises at least 85% based on total weight of said fireproofing composition.

14. The coating system of claim 1 wherein said light-weight aggregate is expanded vermiculite.

15. The coating of claim 1 wherein said light-weight aggregate is perlite.

* * * * *